(12) United States Patent
Saville et al.

(10) Patent No.: US 9,506,566 B2
(45) Date of Patent: Nov. 29, 2016

(54) FINGER-FOIL SEALS AND GAS TURBINE ENGINES EMPLOYING THE SAME

(71) Applicant: HONEYWELL INTERNATIONAL INC., Morristown, NJ (US)

(72) Inventors: Marshall Saville, Torrance, CA (US); Keith Alan Hurley, Garden Grove, CA (US); Joseph Yanof, Phoenix, AZ (US); Tina Hynes, Phoenix, AZ (US); David Waldman, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 542 days.

(21) Appl. No.: 14/061,498

(22) Filed: Oct. 23, 2013

(65) Prior Publication Data

US 2015/0110621 A1    Apr. 23, 2015

(51) Int. Cl.
| | |
|---|---|
| *F01D 11/02* | (2006.01) |
| *F04D 29/10* | (2006.01) |
| *F16J 15/16* | (2006.01) |
| *F16J 15/32* | (2016.01) |

(Continued)

(52) U.S. Cl.
CPC ............ *F16J 15/164* (2013.01); *F01D 11/025* (2013.01); *F04D 29/10* (2013.01); *F04D 29/102* (2013.01); *F16J 15/3212* (2013.01); *F16J 15/3288* (2013.01); *F16J 15/445* (2013.01); *F05D 2240/57* (2013.01); *F05D 2240/59* (2013.01); *F16C 17/024* (2013.01)

(58) Field of Classification Search
CPC .... F01D 11/001; F01D 11/02; F01D 11/025; F04D 29/057; F04D 29/10; F04D 29/102; F04D 29/12; F04D 29/122; F04D 29/16; F04D 29/161; F04D 29/162; F04D 29/164; F05D 2240/55; F05D 2240/57; F05D 2240/59; F16J 15/164; F16J 15/32; F16J 15/3208; F16J 15/3244; F16J 15/3288; F16J 15/3292

See application file for complete search history.

(56) References Cited

U.S. PATENT DOCUMENTS

| | | |
|---|---|---|
| 2,866,656 A | 12/1958 | Dobrosavljevic |
| 3,863,938 A | 2/1975 | Nicholson |
| 4,178,046 A | 12/1979 | Silver et al. |

(Continued)

FOREIGN PATENT DOCUMENTS

EP    0355649 A2    2/1990

OTHER PUBLICATIONS

USPTO Notice of Allowance, Notification Date Jan. 30, 2015; U.S. Appl. No. 13/316,922.

(Continued)

*Primary Examiner* — Christopher R Legendre
(74) *Attorney, Agent, or Firm* — Lorenz & Kopf, LLP (57) ABSTRACT

Embodiments of a gas turbine engine including a finger-foil seal are provided, as are embodiments of a finger-foil seal. In one embodiment, the finger-foil seal includes an aerodynamic foil having a generally annular body through which a first opening is formed. A finger seal retention structure is disposed around the aerodynamic foil. A finger seal backing spring is coupled to the finger seal retention structure and extends radially inward therefrom to contact an outer circumference of the aerodynamic foil. A first anti-rotation pin extends radially from the finger seal retention structure and into the first opening formed in the aerodynamic foil to inhibit rotation of the aerodynamic foil during operation of the finger-foil seal.

20 Claims, 8 Drawing Sheets

(51) Int. Cl.
  *F16J 15/44* (2006.01)
  *F16C 17/02* (2006.01)

(56) References Cited

U.S. PATENT DOCUMENTS

| | | | |
|---|---|---|---|
| 4,738,453 A | 4/1988 | Ide | |
| 5,042,823 A | 8/1991 | Mackay et al. | |
| 5,100,158 A | 3/1992 | Gardner | |
| 5,108,116 A * | 4/1992 | Johnson | F16J 15/3288 277/355 |
| 5,246,295 A | 9/1993 | Ide | |
| 5,370,402 A | 12/1994 | Gardner et al. | |
| 5,385,409 A | 1/1995 | Ide | |
| 5,632,493 A | 5/1997 | Gardner | |
| 5,755,445 A | 5/1998 | Arora | |
| 6,196,550 B1 * | 3/2001 | Arora | F16J 15/3288 277/355 |
| 6,267,381 B1 | 7/2001 | Wright | |
| 6,364,316 B1 | 4/2002 | Arora | |
| 6,505,837 B1 | 1/2003 | Heshmat | |
| 6,736,401 B2 * | 5/2004 | Chung | F01D 9/023 277/355 |
| 6,752,533 B2 | 6/2004 | Saville et al. | |
| 6,811,154 B2 * | 11/2004 | Proctor | F16J 15/164 277/355 |
| 7,077,573 B2 | 7/2006 | Suh et al. | |
| 7,108,488 B2 | 9/2006 | Larue et al. | |
| 7,735,833 B2 * | 6/2010 | Braun | F01D 11/003 277/301 |
| 8,028,996 B2 | 10/2011 | Ruggiero et al. | |
| 9,033,657 B2 * | 5/2015 | Gibson | F16J 15/164 415/231 |
| 2004/0155410 A1 | 8/2004 | Proctor et al. | |
| 2006/0249912 A1 | 11/2006 | Wilson, Jr. | |
| 2008/0122183 A1 | 5/2008 | Braun et al. | |
| 2010/0087346 A1 | 4/2010 | Giesler et al. | |
| 2011/0123329 A1 * | 5/2011 | Takeuchi | F01D 11/001 415/230 |
| 2011/0211783 A1 | 9/2011 | Ishimoto | |
| 2013/0149143 A1 | 6/2013 | Gibson | |
| 2015/0110621 A1 * | 4/2015 | Saville | F01D 11/025 415/230 |

OTHER PUBLICATIONS

USPTO Office Action, Notification Date Jan. 2, 2015; U.S. Appl. No. 13/316,922.

Braun, M. J. et al.: "Structural and Dynamic Considerations towards the Design of a Padded Finger Seal" 39th AIAA/ASME/SAE/ASEE Joint Propulsion Conference AIAA, Huntsville, Alabama, Jul. 20-23, 2003.

Extended EP Search Report for EP 14186289.6-1610 dated Apr. 5, 2015.

* cited by examiner

FINGER-FOIL SEALS AND GAS TURBINE ENGINES EMPLOYING THE SAME

TECHNICAL FIELD

The present invention relates generally to shaft seals and, more particularly, to improved finger-foil seals, as well as to gas turbine engines employing finger-foil seals.

BACKGROUND

During operation, a gas turbine engine compresses intake air, mixes the compressed air with fuel, and ignites the fuel-air mixture to produce combustive gasses, which are then expanded through a number of air turbines to drive rotation of the turbines and produce power. Significant quantities of energy are expended to compress the intake air before the hot, compressed air is supplied to the engine's combustion chamber for fuel injection and combustion. Leakage of the compressed air from the compressor section, especially from the downstream end of the high pressure compressor stage, results in a direct penalty against the engine's power-to-weight ratio and overall fuel efficiency. For this reason, air-to-air shaft seals are commonly positioned around the engine shafts to reduce the leakage of pressurized airflow from the high pressure compressor section and other such high pressure zones of the engine. Labyrinth seals have traditionally been utilized for this purpose, but are prone to degradation over time due to intermittent contact between the static components and the spinning disks or knives of the labyrinth seal. Finger seals can alternatively be employed in a gas turbine engine as an air-to-air shaft seal; and, in general, may provide higher pressure load capacities than do comparable labyrinth seals. Finger seals are, however, also subject to wear due to their contacting design and may require a relatively lengthy break-in process to ensure proper operation. Additionally, constant rubbing may occur between the fingers of the finger seal and the rapidly spinning shaft, which can potentially damage the finger seal or the shaft due to the generation of significant quantities of heat.

Finger-foil seals (also referred to as "lift-off finger seals") have recently been introduced as an advancement over finger seals. A finger-foil seal may include a plurality of spiral-shaped resilient fingers, which collectively form an annular seal around the shaft in much the same way as do the fingers of a conventional finger seal. However, in contrast to a finger seal, the finger-foil seal further includes a radially-expandable aerodynamic foil, which extends around the inner circumference of the fingers and the outer circumference of the shaft. In addition to forming a high integrity, air-to-air seal around the shaft, the resilient fingers serve as a backing spring, which exerts a bias force on aerodynamic foil urging the foil radially inward toward the shaft. During high speed rotation of the shaft, the foil expands radially and lifts-off from the shaft in response to aerodynamic forces generated by rotation of the shaft. The resilient fingers deflect to allow foil lift-off, and a small annular gap is created between the spinning shaft and the aerodynamic foil. Physical contact between the foil and the rapidly spinning shaft is thus minimized reducing seal wear, reducing the generation of frictional heat, and eliminating the need for a lengthy seal break-in process. Further description of finger-foil seals can be found in co-pending U.S. patent application Ser. No. 13/316,922; filed with the USPTO on Dec. 12, 2011; entitled "GAS TURBINE ENGINE INCLUDING LIFT-OFF FINGER SEALS, LIFT-OFF FINGER SEALS, AND METHOD FOR THE MANUFACTURE THEREOF"; and assigned to Honeywell International Inc., the assignee and Applicant of the instant Application.

While finger-foil seals provide the above-described advantages as compared to finger seals, labyrinth seals, and other conventionally-known shaft seals, further improvements in finger-foil seals are still desired. Embodiments of improved finger-foil seals having increased pressure load capabilities are provided herein, as are embodiments of gas turbine engines including improved finger-foil seals. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a finger-foil seal are provided. In one embodiment, the finger-foil seal includes an aerodynamic foil having a generally annular body through which a first opening is formed. A finger seal retention structure is disposed around the aerodynamic foil. A finger seal backing spring is coupled to the finger seal retention structure and extends radially inward therefrom to contact an outer circumference of the aerodynamic foil. A first anti-rotation pin extends radially from the finger seal retention structure and into the first opening formed in the aerodynamic foil to inhibit rotation of the aerodynamic foil during operation of the finger-foil seal.

In a further embodiment, the finger-foil seal includes an aerodynamic foil having a generally annular body through which a first opening is formed. A finger seal retention structure is disposed around the aerodynamic foil. A finger seal backing spring is coupled to the finger seal retention structure and extends radially inward therefrom to contact an outer circumference of the aerodynamic foil. The finger seal backing spring includes at least one laminate having a predetermined radial stiffness profile that varies as taken around the inner circumference of the laminate.

In a still further embodiment, the finger-foil seal includes an aerodynamic foil having a generally annular body through which a first opening is formed. A finger seal retention structure is disposed around the aerodynamic foil. A finger seal backing spring is coupled to the finger seal retention structure and extends radially inward therefrom to contact an outer circumference of the aerodynamic foil. The finger seal backing spring is comprised of a plurality of laminates and has a predetermined radial stiffness profile that varies as taken axially through the finger seal backing spring from laminate to laminate.

Embodiments of a gas turbine engine are further provided. In one embodiment, the gas turbine engine includes an engine housing containing a high pressure zone and a low pressure zone during operation of the gas turbine engine. A shaft is rotatably mounted in the engine housing and extends from the low pressure zone to the high pressure zone. The gas turbine engine further contains a finger-foil seal, which includes an aerodynamic foil disposed around the shaft and having a generally annular body through which a first opening is formed. A finger seal retention structure is disposed around the aerodynamic foil. A finger seal backing spring is coupled to the finger seal retention structure and extends radially inward therefrom to contact an outer circumference of the aerodynamic foil. A first anti-rotation pin extends radially from the finger seal retention structure and into the first opening formed in the aerodynamic foil to inhibit rotation of the aerodynamic foil during operation of the finger-foil seal.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The term "finger-foil seal," as appearing herein, refers to an annular shaft seal including an aerodynamic foil, which is supported by a finger seal backing spring of the type described below; which extends around a shaft (e.g., the shaft of a gas turbine engine) in a close tolerance fit when the shaft is in a cold, static condition or rotating at a relatively low rate of speed; and which expands radially outward (grow in inner diameter) in response to aerodynamic forces generated during high speed rotation of the shaft. Furthermore, the term "finger seal backing spring" encompasses any structure having elongated, resilient members exerting a spring force on the outer circumferential surface of an aerodynamic foil. The term "finger seal backing spring" may thus refer to a structure produced from a number of laminates into which spiral-shaped beams or fingers are cut or otherwise formed, as described below; as well as to an annular brush seal or similar resilient device, which is disposed around an aerodynamic foil and exerts an inward radial bias force thereon.

Embodiments of an improved finger-foil seal are described herein. Embodiments of the finger-foil seal may be improved over other known finger-foil seals, such as those described in the co-pending patent application referenced in the foregoing section entitled "BACKGROUND," in a number of different respects, which favorably increase the overall pressure load capacity of the finger-foil seal. For example, in at least some embodiments, the finger-foil seal may include an improved foil retention structure, which maintains the aerodynamic foil in a desired position or range of positions, while minimizing the transmission of bending forces to the foil. In so doing, the foil retention structure prevents or at least reduces the distortion of the foil that may otherwise occur during seal operation to increase the pressure load capacity of the finger-foil seal. Additionally or alternatively, embodiments of the finger-foil seal may include a finger seal backing spring having a radial stiffnesses profile that varies circumferentially and/or in an axial direction (e.g., from laminate to laminate when the backing spring comprises a multi-laminate stack) to bring about still further enhancements in the sealing capacity of the seal. Embodiments of the finger-foil seal can be employed in any application wherein it is desired to provide a high integrity annular seal around a rotating shaft. This notwithstanding, the below-described embodiments of the finger-foil seal are particularly useful for deployment within a gas turbine engine and will consequently be described below primarily as such.

Figure 1:
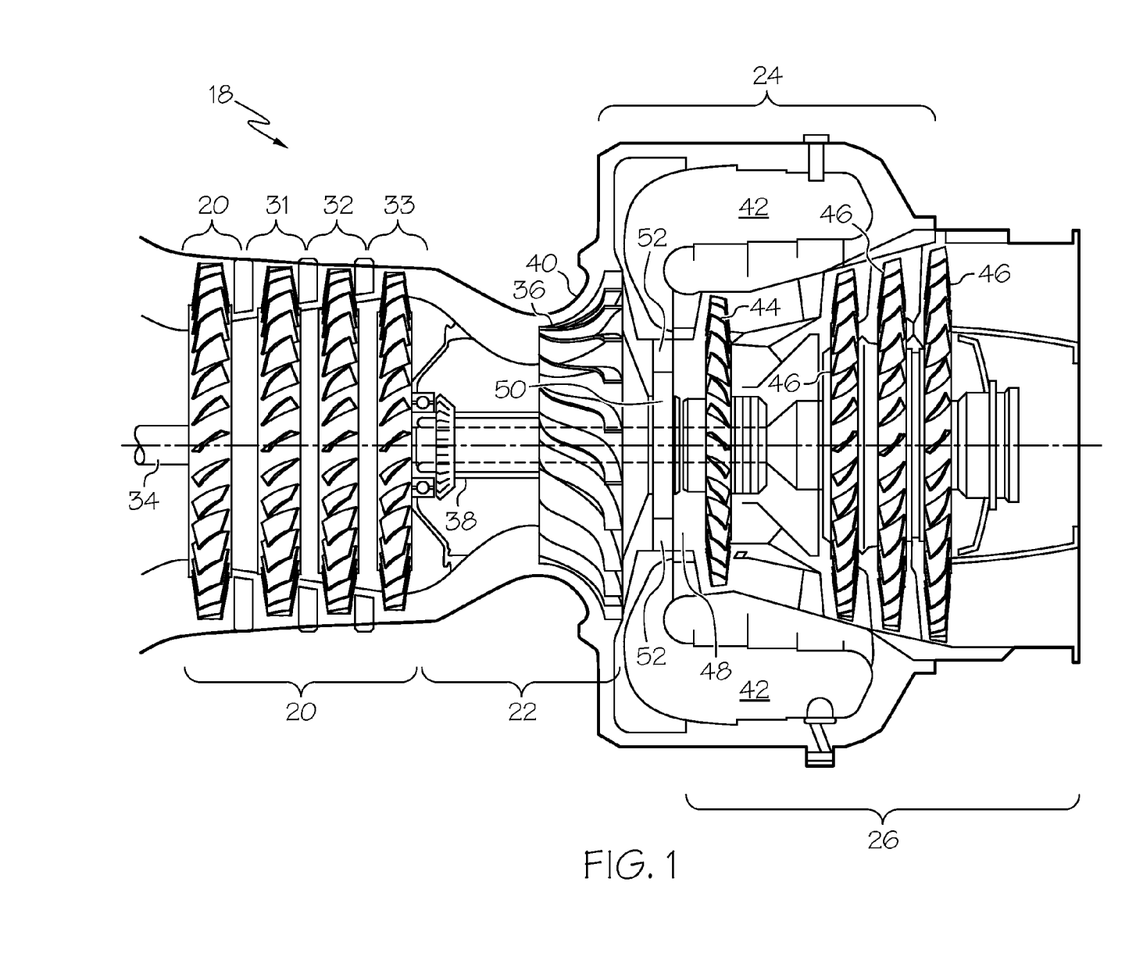
FIG. 1 is a schematic illustrating an exemplary gas turbine engine (partially shown) including a low pressure compressor section, a high pressure compressor section, a combustor section, and a turbine section.

FIG. 1 is a generalized schematic of a portion of a gas turbine engine (GTE) 18 including a low pressure compressor section 20, a high pressure compressor section 22, a combustor section 24, and a turbine section 26. In this particular example, low pressure compressor section 20 includes a plurality of axial compressor stages 30-33, which each include an axial compressor mounted to a low pressure ("LP") shaft 34. High pressure compressor section 22 is positioned immediately downstream of low pressure compressor section 20 and includes a single centrifugal compressor or impeller 36. Centrifugal impeller 36 is mounted to a high pressure ("HP") shaft 38, which is co-axial with LP shaft 34 and through which LP shaft 34 extends. A shroud 40 encloses impeller 36 to guide airflow exhausted by impeller 36 into combustor section 24. Combustor section 24 includes at least one combustor 42 having an outlet nozzle, which directs combustive gas flow into turbine section 26.

More specifically, the outlet nozzle of combustor 42 directs combustive gas flow from combustor section 24, through a high pressure turbine 44 mounted to HP shaft 38, and subsequently through a series of low pressure turbines 46 mounted to LP shaft 34. Although not illustrated in FIG. 1 for clarity, GTE 18 further includes additional sections, such as an intake section (e.g., a fan module) upstream of compressor section 20 and an exhaust section downstream of turbine section 26.

During GTE operation, the axial compressors within compressor stages 30-33 rotate in conjunction with LP shaft 34 to compress airflow received from the intake section of GTE 18. The compressed airflow is supplied to high pressure compressor section 22 and further compressed by impeller 36, which rotates in conjunction with HP shaft 38. The hot, compressed airflow is then directed into combustion chamber 42, mixed with fuel, and ignited. The air heats rapidly, expands, and flows from combustion chamber 42 and into the inlet of high pressure turbine 44. The combustive gas flow drives the rotation of turbine 44 and, therefore, the rotation of HP shaft 38 and impeller 36. After being exhausted from high pressure turbine 44, the combustive gases flow through low pressure turbines 46 to drive the rotation of turbines 46 and, therefore, the rotation of LP shaft 34 and the axial compressors within compressor stages 30-33. The power output of GTE 18 may be utilized in a variety of different manners, depending upon whether GTE 18 assumes the form of a turbofan, turboprop, turboshaft, turbojet engine, or an auxiliary power unit, to list but a few examples.

Considerable energy is expended to compress the intake air within compressor sections 20 and 22 before the compressed air is supplied to combustion section 24 for fuel injection and combustion. The air pressure at the outlet end or exducer end of impeller 36 will typically be higher than the pressure within the adjoining cavity 48 in which HP turbine 44 is rotatably mounted. To optimize engine performance, it is desirable to minimize leakage of pressurized airflow from the outlet of impeller 36 directly into high pressure turbine cavity 48. For this reason, an air-to-air shaft seal 50 may be positioned around HP shaft 38 between impeller 36 and HP turbine 44 and affixed to an internal mounting structure 52 provided within GTE 18, as generically illustrated in FIG. 1. While labyrinth seals, conventional contacting-type finger seals, and other types of seals are known that are generally suitable for usage as air-to-air shaft seal 50, the integrity of such conventionally-known seals tend to degrade over time due to continuous or intermittent contact between spinning and stationary components. Thus, in accordance with embodiments of the present invention, air-to-air shaft seal 50 assumes the form of a finger-foil seal, which not only provides excellent sealing properties similar to those achieved by conventional contacting-type finger seals, but which also lifts-off from or further separates from the shaft during high speed rotation to reduce seal wear and preserve seal integrity over the operational lifespan of GTE 18. Exemplary embodiments of such finger-foil seals suitable for usage as air-to-air shaft seal 50 are described more fully below in conjunction with FIGS. 2-9.

Before embarking on a description of exemplary embodiments of the finger-foil seal, it should be noted that the placement of air-to-air shaft seal 50 shown in FIG. 1 is provided by way of example only and that embodiments of the finger-foil seal described herein can be positioned at any location within a gas turbine engine (or other rotating machine) wherein it is desired to prevent leakage of pressurized air (or other fluid) by forming an annular seal around a spinning shaft. For example, in further embodiments, the finger-foil seal may be positioned around the high pressure turbine cooling system (not shown in FIG. 1) to prevent leakage of the core airflow (e.g., the combustive gasses exhausted from combustion chamber 42) into the cooling flow passages conducting secondary airflow. It should also be readily appreciated that GTE 18 is provided by way of example only and that embodiments of finger-foil seal can be utilized within numerous other types of gas turbine engine platforms, as well as within various other types of rotating machines including, but not limited to, other types of turbomachines. A non-exhaustive list of other rotating machines in which embodiments of the finger-foil seal may be employed includes air cycle machines, turbocompressors, turbogenerators, turboalternators, motor-driven compressors, and shaft driven compressors, to list but a few examples. Embodiments of the finger-foil seal described herein may also be utilized to fluidly isolate high and low pressure zones containing fluids other than pressurized air; e.g., in certain instances, embodiments of the finger-foil seal may be employed as an air-to-oil seal.

Figure 2:
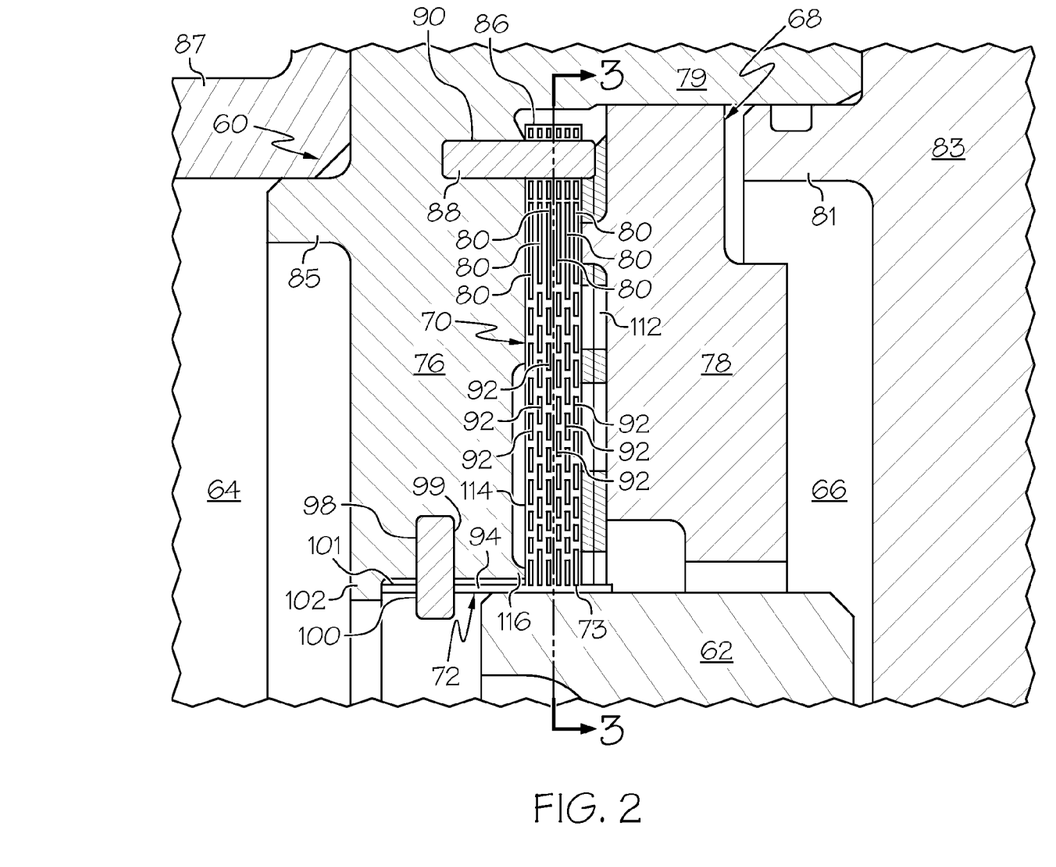
FIG. 2 is a cross-sectional view of an upper portion of a finger-foil seal that may be employed within the gas turbine engine shown in FIG. 1, as depicted prior to high speed rotation of the shaft and seal lift-off and as illustrated in accordance with a first exemplary embodiment of the present invention.

FIG. 2 is a cross-sectional view of an upper portion of a finger-foil seal 60 positioned around a shaft and runner 62 (referred to herein collectively as "shaft 62"), as illustrated in accordance with an exemplary embodiment of the present invention. While only upper portions of seal 60 and shaft 62 are shown in FIG. 2 for clarity, it will be appreciated that finger-foil seal 60 and shaft 62 are generally axisymmetric about the rotational axis of shaft 62. Shaft 62 extends between a low pressure zone 64 and a neighboring high pressure zone 66, which are separated or partitioned by finger-foil seal 60. As appearing herein, the term "low pressure zone" is utilized in a relative sense to denote a cavity or area containing a fluid at a pressure lower than the fluid within a neighboring cavity or area during operation of a gas turbine engine or other rotating machine. Conversely, the term "high pressure zone" denotes a cavity or other area containing a fluid pressure higher than that contained within a neighboring cavity or area during engine operation. As indicated above, finger-foil seal 60 is advantageously employed as air-to-air shaft seal 50 within GTE 18 shown in FIG. 1. In this case, shaft 62 may be analogous to shaft 38 (FIG. 1); the engine cavity in which impeller 36 is rotatably mounted may encompass or otherwise be included within high pressure zone 66; and the engine cavity in which turbine cavity 48 is rotatably mounted may encompass or otherwise be included within low pressure zone 64.

Finger-foil seal 60 includes a finger seal retention structure 68, an annular finger seal backing spring 70, and an aerodynamic foil 72. Finger seal backing spring 70 extends around the outer circumference of shaft 62 at a location between low pressure zone 64 and high pressure zone 66. Aerodynamic foil 72 likewise extends around the outer circumference of shaft 62, and a portion of foil 72 is positioned within a central opening 73 provided in backing spring 70. Finger seal retention structure 68 maintains finger seal backing spring 70 and aerodynamic foil 72 in their desired positions around shaft 62, while permitting the outward radial expansion of aerodynamic foil 72 and the corresponding radial deflection of backing spring 70, as described more fully below. Finger seal retention structure 68 may include any number of structural components suitable for performing this function. In the illustrated example, finger seal retention structure 68 includes a Low Pressure ("LP") cover plate 76 and an opposing High Pressure ("HP") cover plate 78, which are positioned against opposing sides of finger seal backing spring 70. Specifically, LP cover plate 76 is positioned over and covers at least a portion of the face of backing spring 70 exposed to the fluid within low pressure zone 64 (also referred to herein as the "low pressure face" of backing spring 70), while HP cover plate 78 is positioned over and covers at least a portion the face of backing spring 70 exposed to the fluid within high pressure zone 66 (referred to herein as the "high pressure face" of backing spring 70).

LP cover plate 76 may be fabricated to include a relatively large, outer cylindrical extension 79, which extends from the body of cover plate 76 toward high pressure zone 66. As indicated in FIG. 2, finger seal backing spring 70 and HP cover plate 78 may seat within cylindrical extension 79 when finger-foil seal 60 is fully assembled. Additionally, at the high pressure side of finger-foil seal 60, cylindrical extension 79 may pilot with an annular ledge 81 projecting from a neighboring structural component 83 included within the static engine infrastructure of GTE 18 (FIG. 1). In a similar regard, LP cover plate 76 may be produced to include an annular ledge or neck 85, which pilots to a second structure 87 located adjacent the low pressure side of finger-foil seal 60 and further included within the static infrastructure of GTE 18 (FIG. 1). The foregoing notwithstanding, the particular manner in which finger-foil seal 60 is assembled and installed within GTE 18 (another rotating machine) will inevitably vary amongst embodiments.

Figure 3:
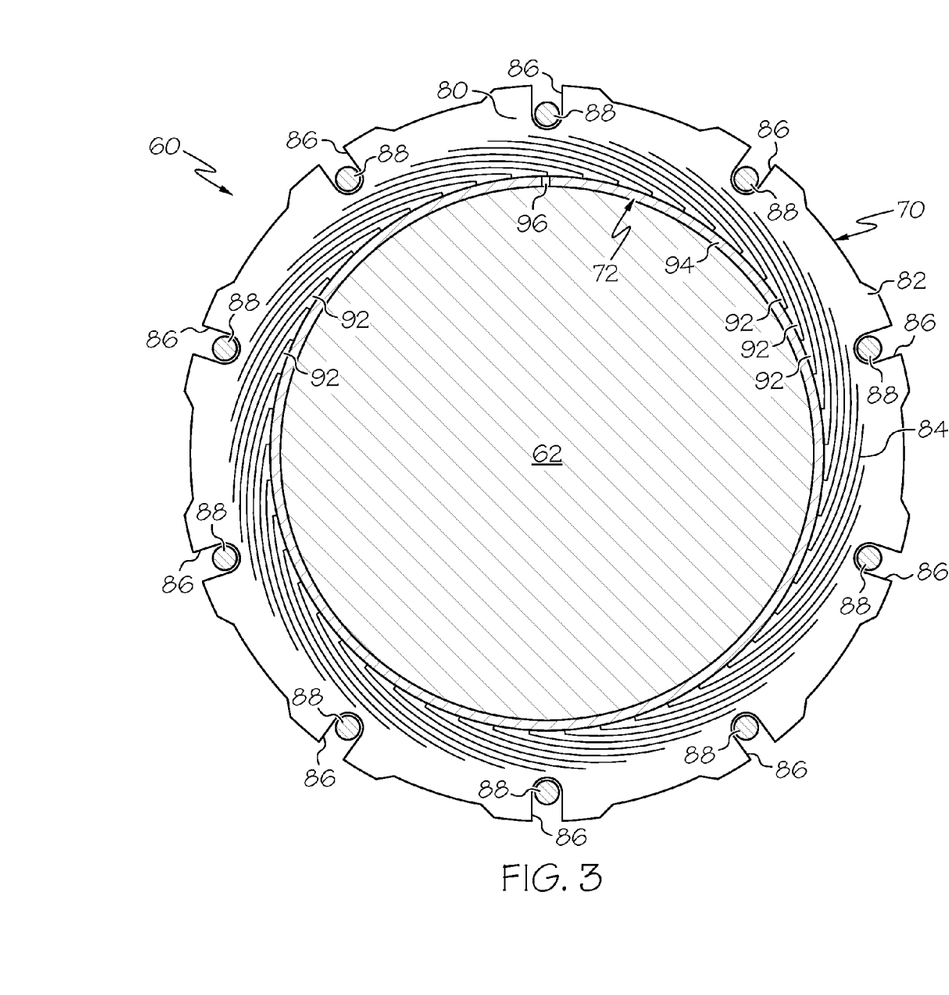
FIG. 3 is a cross-sectional view of the finger-foil seal shown in FIG. 2, as taken along line 3-3 in FIG. 2 and illustrating an exemplary disk-shaped laminate that may be included in the finger seal backing spring.

Finger seal backing spring 70 is conveniently, although not necessarily, fabricated from a stack of disc-shaped laminates 80; e.g., backing spring 70 may be comprised of two to six laminates 80, which may be clamped together utilizing, for example, a plurality of rivets, bolts, or other such fasteners (not shown). In other embodiments, backing spring 70 may be produced to include an even greater number of laminates. FIG. 3 is a cross-sectional view of finger-foil seal 60 (as taken along line 3-3 in FIG. 2) illustrating the frontside of one laminate 80, which may be included within finger seal backing spring 70 and which may be generally representative of all laminates 80 included within backing spring 70. As can be seen in FIG. 3, the illustrated laminate 80 assumes the form of a relatively thin, annular disc having a central opening in which foil 72 is positioned and through which shaft 62 extends. Laminate 80 further includes an outer circumferential flange portion 82 in which a plurality of circumferentially-spaced openings or notches 86 has been formed. When backing spring 70 is properly positioned with respect to LP cover plate 76, or notches 86 align with corresponding openings 90 provided in the inner circumferential face of cover plate 76 (one of which is shown in FIG. 2). An axially-extending locating pin 88 may be inserted into each aligning pair of notches 86 and openings 90 to secure finger seal backing spring 70 in its desired position. Furthermore, when affixed over the high pressure face of backing spring 70, HP cover plate 78 may obstruct the back-driving of locating pins 88 in the presence of high vibratory forces, such as those produced during operation of gas turbine engine 18 (FIG. 1).

With continued reference to the exemplary embodiment shown in FIGS. 2 and 3, and as shown most clearly in FIG. 3, a series of slits is laser cut into or otherwise formed within an inner circumferential portion 84 of each laminate 80 to define a plurality of elongated resilient beams or fingers 92 (six of which are labeled in FIG. 3). Fingers 92 extend radially inward from outer flange portion 82 and follow a generally spiral-shaped path, which twists about the centerline of finger-foil seal 60 (corresponding to the rotational axis of shaft 62). Fingers 92 may be fabricated to include slightly enlarged inner terminal ends or pads, which collectively present a relatively smooth, continuous inner circumferential surface for contact with aerodynamic foil 72 to facilitate sliding movement between fingers 92 and foil 72, as described below. Laminates 80 are produced from a resilient material such that fingers 92 serve as elongated spring members, which collectively exert a bias force on foil 72 urging foil 72 radially inward toward the non-expanded state shown in FIG. 2. In gas turbine engine and other high temperature applications, laminates 80 may be produced from cobalt-based superalloys (e.g., HAYNES 25®), nickel-based superalloys (e.g., INCONEL 718®), and other high temperature superalloys. When finger-foil seal 60 is instead utilized within a low to moderate temperature application, laminates 80 may be produced from stainless steel, a polymer, or a composite material. The foregoing notwithstanding, the particular material or materials from which laminates 80 are produced will inevitably vary amongst different embodiments.

Figure 4:
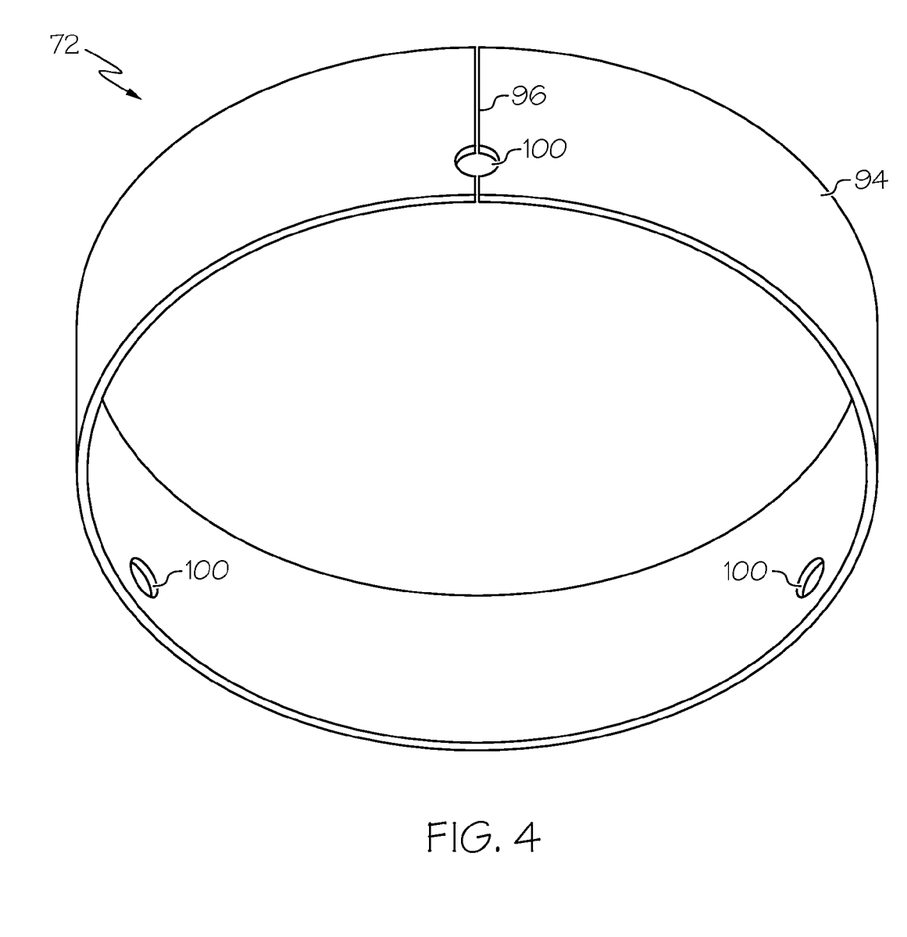
FIG. 4 is an isometric view of the aerodynamic foil included within the finger-foil seal shown in FIGS. 2 and 3.

Aerodynamic foil 72 includes a relatively thin, flexible, annular foil body 94, which is disposed around shaft 62 and which is generally conformal with the outer contour of shaft 62. While extending around or essentially circumscribing an outer circumference of shaft 62, annular foil body 94 does not form a complete loop or a continuous ring around shaft 62. Instead, as shown most clearly in FIG. 4 (an isometric view of foil 72), aerodynamic foil 72 has a split design such that a relatively narrow circumferential gap 96 separates opposing longitudinal edges of annular foil body 94. Gap 96 allows aerodynamic foil 72 to expand radially outward and thus grow in inner diameter during foil lift-off, as described more fully below. Aerodynamic foil 72 may be manufactured as a flexible strip or sheet of material, which is rolled into a cylinder having an inner diameter substantially equivalent with the outer diameter of shaft 62. During such a manufacturing process, a sheet of material may be cut into desired dimensions and then rolled into the desired cylindrical shape. The sheet of material from which aerodynamic foil 72 is produced may include one or more layers; e.g., a substrate and a solid-film lubricant layer, which is formed over the inner face of the substrate to minimize friction with the outer surface of shaft 62. Suitable materials include those utilized in the production of foil bearings, such as nickel-based superalloys in the case of high temperature applications and stainless steel in the case of low temperature applications. Foil 72 may be fabricated from various other materials in still further embodiments of finger-foil seal 60.

Finger-foil seal 60 further includes at least one feature, such as one or more anti-rotation pins, that prevent or at least inhibit rotation of aerodynamic foil 72 about the rotational axis of shaft 62. In the illustrated example, finger-foil seal 60 include three such anti-rotation pins 98, which are angularly distributed around foil 72 and which extend through a number of circumferentially-spaced openings 100 provided in foil 72 (shown in FIG. 4). As indicated in FIG. 2, each anti-rotation pin 98 extends essentially in a radial direction (that is, such that the longitudinal axis of the pin is substantially perpendicular to the rotational axis of shaft 62 and the longitudinal axis of seal 60) through its corresponding opening 100 provided in foil 72. The outer terminal ends of pins 98 are affixed to retention structure 68; e.g., the outer terminal end of each pin 98 may be inserted into bores 99 drilled into or otherwise formed within the inner circumferential face of LP cover plate 76. Anti-rotation pins 98 extend across an annular or circumferential clearance 101 provided between the inner circumferential face of LP cover plate 76 and the outer circumference aerodynamic foil 72 when in the non-expanded state shown in FIGS. 2 and 3. Thus, as pins 98 are affixed to retention structure 68, and as openings 100 are sized to be slightly larger than pins 98, anti-rotation pins 98 generally prevent rotation of foil 72 during operation of finger-foil seal 60. The shape of openings 100 will vary in conjunction with the cross-sectional shapes of pins 98, which are by no means limited to a particular geometry, but are conveniently selected to have a circular, ovular, or polygonal (e.g., rectangular) cross-sectional geometry.

Finger-foil seal 60 is further produced to include at least one axial retention feature, which prevents axial dislodgement or "blow through" of aerodynamic foil 72 in the presence of the significant pressure gradients that may develop across seal 60. In the exemplary embodiment illustrated in FIGS. 2-4, this axial retention feature is provided in the form of an inner circumferential ledge or annular shoulder 102, which extends radially inward from LP cover plate 76 proximate anti-rotation pins 98. As shown in FIG. 2, the low pressure edge of aerodynamic foil 72 abuts shoulder 102 to physically obstruct dislodgement of foil 72 in an axial direction due to the pressure differential between high pressure area 66 and low pressure area 64. Shoulder 102 may comprise a general cylindrical or ring-shaped projection having a radial height equal to or greater than the radial dimension of annular clearance 101 so as to allow aerodynamic foil 72 to slide radially outward along the inner face of shoulder 102 during foil lift-off, as described more fully below in conjunction with FIG. 5. Due to its inherent resiliency, finger seal backing spring 70 exerts a circumferential preload on aerodynamic foil 72 to bias aerodynamic foil 72 toward shaft 62. As a result of this bias and the dimensions of foil 72, aerodynamic foil 72 extends around the outer circumference of shaft 62 in a close tolerance fit when shaft 62 is stationary or rotating at a relatively low rate of speed. In the illustrated embodiment, aerodynamic foil 72 circumferentially contacts or engages the outer surface of shaft 62 when shaft 62 is in a cold, static condition. When the rotational speed of shaft 62 surpasses a predetermined threshold, fingers 92 of finger seal backing spring 70 deflect outward in radial directions to accommodate the circumferential expansion of aerodynamic foil 72.

Figure 5:
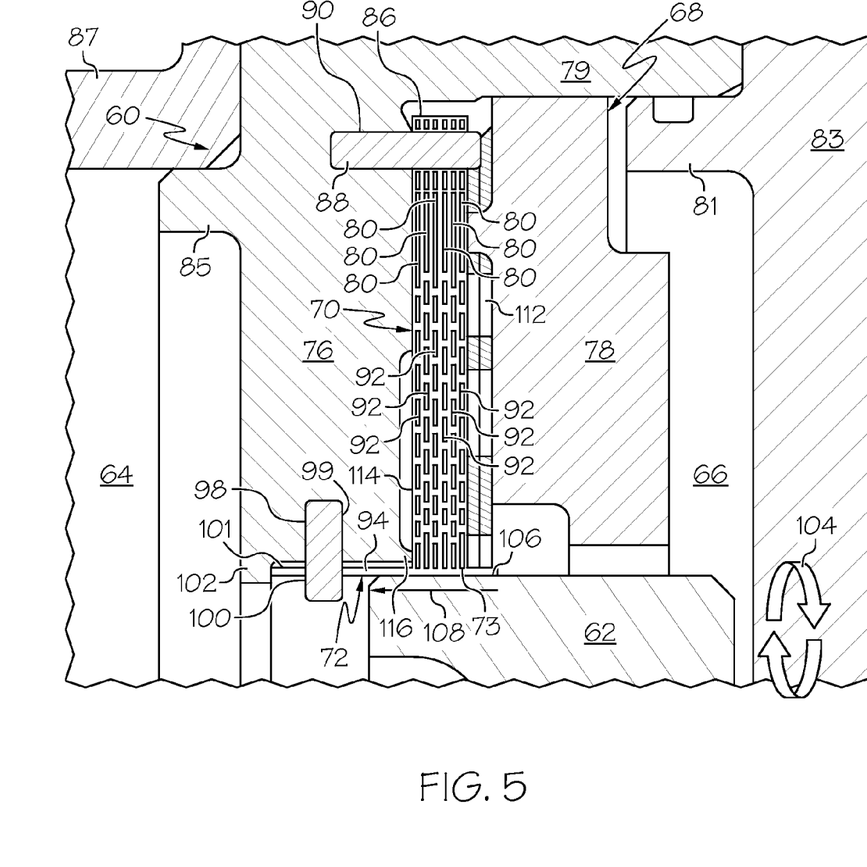
FIG. 5 is a cross-sectional view of the upper portion of the finger-foil seal shown in FIG. 2, as illustrated during high speed rotation of the shaft and seal lift-off.

FIG. 5 illustrates finger-foil seal 60 during high speed rotation of shaft 62 (represented by arrows 104) and seal lift-off. As can be seen in FIG. 5, aerodynamic foil 72 has lifted from the outer circumferential surface of shaft 62 in response to aerodynamic pressure generated by rotation of shaft 62, which draws airflow into a moving convergent wedge formed by shaft 62 and aerodynamic foil 72. Aerodynamic foil 72 deflects in a radially outward direction and circumferentially expands in response to aerodynamic pressure generated during high speed rotation of shaft 62. A small annular gap or clearance 106 (FIG. 5) is thus created between shaft 62 and aerodynamic foil 72 (or, in embodiments wherein foil 72 does not contact the outer surface of shaft 62 when stationary or slowly rotating, the radial width annular gap of the annular gap between shaft 62 and foil 72 increases during seal lift-off). As further indicated in FIG. 5 by arrow 108, annular clearance 106 allows a low, controlled leakage across finger-foil seal 60. Radially-resilient fingers 92 deflect in a radial direction to accommodate circumferential expansion of aerodynamic foil 72 and seal lift-off. Contact between aerodynamic foil 72 and shaft 62 is thus avoided during high speed rotation of shaft 62. Notably, radially-extending anti-rotation pins 98 and inner annular shoulder 102 of LP cover plate 76 permit outward radial expansion of aerodynamic foil 72 in this manner without imparting undesired bending forces to foil 72. Twisting or other distortion of foil 72 is thus prevented or at least significantly reduced, and the pressure load capacity of finger-foil seal 60 is increased as a result.

Finger seal backing spring 70 further deflects, as needed, to accommodate radial displacement of aerodynamic foil 72, which follows shaft 62 during radial displacement thereof. Finger seal backing spring 70 creates an annular seal around shaft 62, which moves radially in conjunction with displacement of shaft 62, to minimize the leakage of pressurized fluid from high pressure cavity 66 into low pressure cavity 64. Finger seal backing spring 70 provides an effective seal impeding pressurized airflow across seal 60 due to the close-contacting design of fingers 92; that is, the slits defining fingers 92 are relatively narrow. In addition, each laminate 80 may be slightly rotated or angularly staggered with respect to its neighboring laminate or laminates 80 about the longitudinal axis of finger-foil seal 60 (e.g., clocked by one finger) such that the slits defining fingers 92 do not align to further discourage pressurized airflow through finger seal backing spring 70.

Finger-foil seal 60 may include various additional structure features and components beyond those described above; e.g., in at least some embodiments, finger-foil seal 60 may be produced to further include a pressure balance circuit. In this regard, finger-foil seal 60 may include a pressure balance circuit having an inlet flow passage 112 and a pressure balance cavity 114 (FIGS. 2 and 5). Flow passage 112 and pressure balance cavity 114 may be fluidly coupled by way of one or more additional, non-illustrated flow passages, which may be formed through finger seal backing spring 70 and/or an outer peripheral portion of finger seal backing spring 70. Such a pressure balance circuit allows pressurized airflow entering inlet flow passage 112 to flow into pressure balance cavity 114 during engine operation. This decreases the pressure differential across finger seal backing spring 70 to minimize unwanted distortion of backing spring 70. Additionally, pressure balance cavity 114 may include an inner dam 116, which contacts an inner portion of finger seal backing spring 70 to reduce leakage from cavity 114 and minimize the radial load placed on aerodynamic foil 72. Further description of pressure balance circuits suitable for inclusion within finger-foil seal 60 can be found in the co-pending U.S. patent application referenced in the foregoing section entitled "BACKGROUND."

There has thus been provided an exemplary embodiment of a finger-foil seal having an improved foil retention structure, which maintains the aerodynamic foil in a desired range of positions, while minimizing the transmission of bending forces transmitted to the aerodynamic foil to reduce foil distortion and the pressure load capabilities of the seal. As described above, the finger-foil seal may include at least one anti-rotation pin, which extends radially from the finger seal retention structure into an opening or aperture providing in the annular body of the aerodynamic foil to prevent or at least deter rotation of the foil during seal operation. The finger seal retention structure also includes at least one axial retention member, which prevents axial dislodgement or blow-through of the finger-foil seal due to the large pressure gradients that develop across the seal during pressure loading thereof. In the above-described exemplary embodiment, the axial retention member assumed the form of an annular lip or shoulder extending radially inward from the low pressure cover plate and abutted by an edge of the foil. However, in further embodiments, the axial retention member may assume other forms; and, in certain instances, the anti-rotation pin or pins may also serve to axially retain the aerodynamic foil. An example of such a finger-foil seal wherein the foil is axially retained by one or more anti-rotation pins provided on the high pressure side of the finger-foil seal is described below in conjunction with FIGS. 6 and 7.

Figure 6:
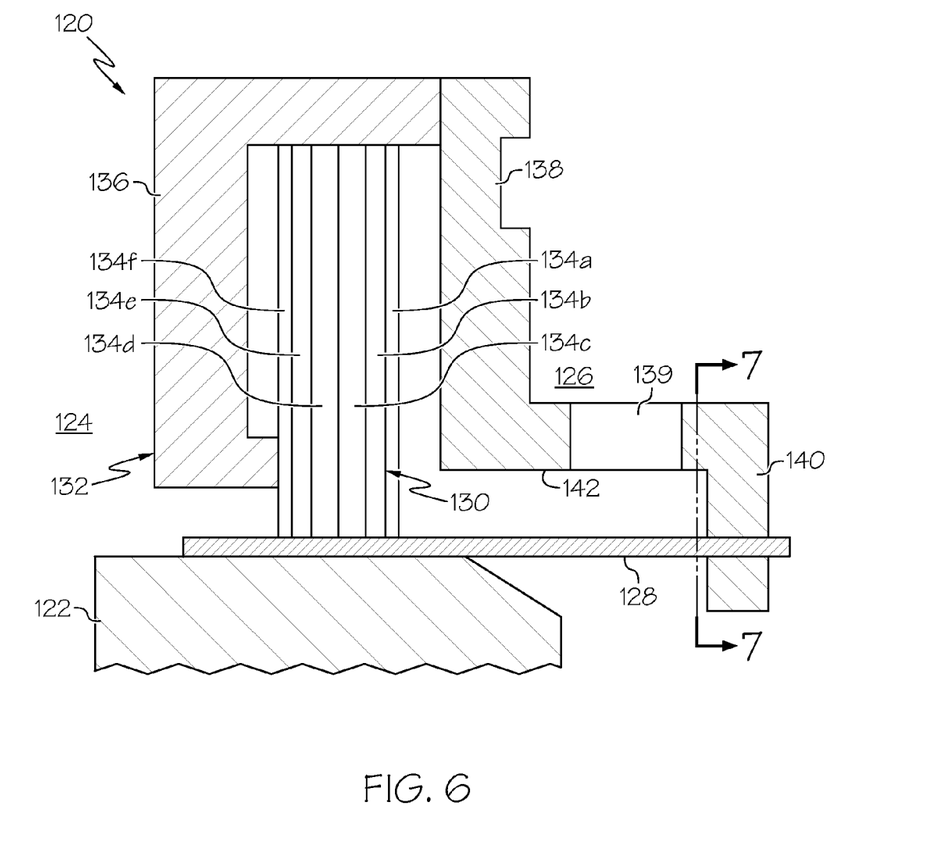
FIG. 6 is a cross-sectional view of an upper portion of a finger-foil seal that may be employed within the gas turbine engine shown in FIG. 1, as depicted prior to high speed rotation of the shaft and seal lift-off and as illustrated in accordance with a second exemplary embodiment of the present invention.

FIG. 6 is a cross-sectional view of a finger-foil seal 120 (partially shown), as illustrated in accordance with a further exemplary embodiment of the present in invention. Finger-foil seal 120 is disposed around a shaft 122, which extends between low and high pressure cavities 124 and 126, respectively. In many respects, finger-foil seal 120 is similar to finger-foil seal 60 described above in conjunction with FIGS. 2-5. For example, finger-foil seal 120 includes a finger seal backing spring 130 produced from a number (e.g., six) laminates 134, which are joined together in a stacked configuration. Laminates 134 may each be essentially identical to laminate 80 described above in conjunction with FIG. 3 with the following exception: neighboring pairs of laminates 134 may be imparted with disparate thicknesses to impart finger seal backing spring 130 with a predetermined radial stiffness profile that varies when moving axially through spring 130 from laminate to laminate, as described more fully below in conjunction with FIG. 10. An aerodynamic foil 128 is positioned around the inner circumference of finger seal backing spring 130 and around the outer circumference of shaft 122. A finger seal retaining structure 132 secures backing spring 130 and foil 128 in their desired positions. As was the case previously, retaining structure 132 includes a low pressure cover plate 136 and a high pressure cover plate 138, which are positioned over opposing faces of finger seal backing spring 130.

Figure 7:
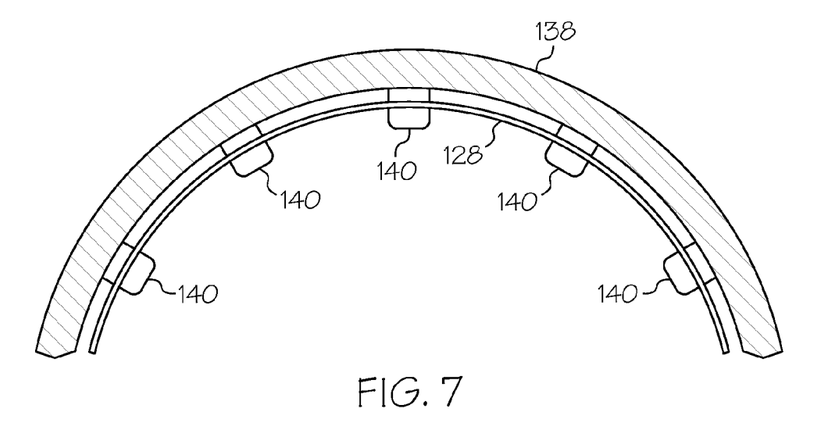
FIG. 7 is a cross-sectional view of the finger-foil seal shown in FIG. 6, as taken along line 7-7 in FIG. 6, illustrating one manner in which a plurality of anti-rotation pins may extend radially into a number of circumferentially-spaced openings in the aerodynamic foil to retain the foil in an axial direction.

As opposed to finger-foil seal 60 described above in conjunction with FIGS. 2-5, finger-foil seal 120 further includes a plurality of anti-rotation pins 140, which are affixed to and extend radially inward from high pressure cover plate 138. More specifically, and as shown most clearly in FIG. 7 (a cross-sectional view of finger-foil seal 120 taken along line 7-7 in FIG. 6), anti-rotation pins 140 extend radially from a tubular extension 142 projecting axially from high pressure cover plate 138. A number of openings 139 may be formed through tubular extension 142 to allow airflow to the high pressure face of backing spring 130. As indicated in FIGS. 6 and 7, anti-rotation pins 140 extend radially from extension 142 into a plurality of circumferentially-spaced openings proved in foil 128. As a result of this structural configuration, anti-rotation pins 140 not only inhibit rotation of foil 128, but also further serve to axially retain foil 128 to prevent blow-through of foil 128 during operation of seal 120. Anti-rotations pins 140 may have any shape and dimensions suitable for performing this function, but preferably have generally square or rectangular planform shapes.

Figure 8:
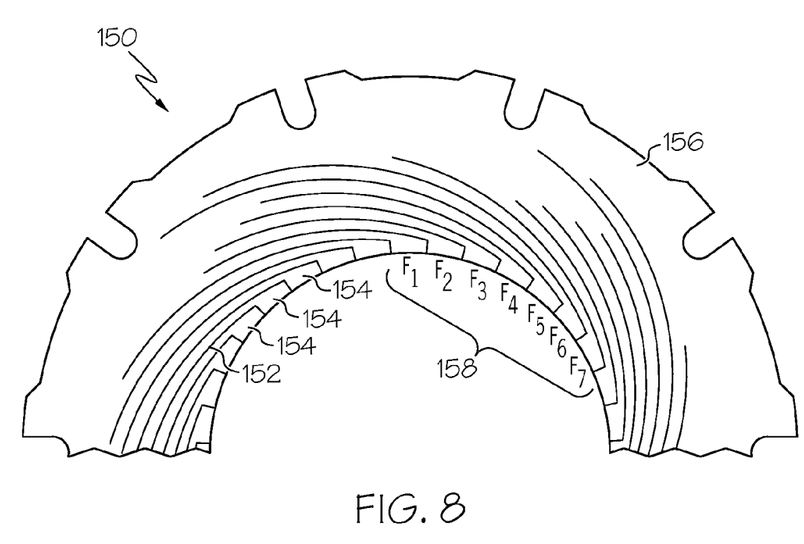
FIG. 8 illustrates the upper half of a laminate having a variable radial stiffness, as taken about the inner circumference of the laminate, which may be included in the finger seal backing spring shown in FIGS. 1-5 or in the finger-foil backing spring shown in FIGS. 6 and 7 to bring about further improvements in pressure load capabilities of the finger-foil seal.

Still further improvements in the pressure load capacity of the finger-foil seal can be achieved by imparting the finger seal backing spring with a variable radial stiffness, as taken about the inner circumference of the backing spring and/or as taken axially through backing spring (e.g., from laminate to laminate). In preferred embodiments wherein the finger seal backing spring is produced from a stack of laminates each having an annular array of resilient fingers, each finger may be imparted with a predetermined stiffness by adjusting the finger width, thickness, and/or length. As a more specific example, the respective stiffnesses of the fingers included within a given laminate may be controlled by varying the lengths of spiral-shaped slits formed in the inner peripheral portion of the laminate defining the fingers. Further illustrating this point, FIG. 8 is a front view of a laminate 150 having an inner peripheral portion 152 in which a number of slits have been cut to define an annular array of resilient fingers 154 (three of which are labeled in FIG. 8). As can be seen, certain slits encroach further into outer peripheral portion 156 of laminate 150 than do other slits to impart fingers 154 with varying lengths and, therefore, disparate stiffnesses, as taken in a radially outward direction. Resilient fingers 154 may be divided into a number of neighboring groupings each containing a subset of fingers 154. One such grouping is identified in FIG. 8 by reference numeral "158" and encompasses seven adjacent fingers. In further embodiments, the groupings may include fewer or a greater number of fingers. Laminate 150 may be fabricated such that each grouping 158 has a radial finger stiffness that varies in accordance with a predetermined stiffness profile, as taken about the inner circumference of laminate 150 moving from the first or furthest upstream finger in the grouping (identified in FIG. 8 as finger "$F_1$") to the last or furthest downstream finger in the grouping (identified as finger "$F_7$").

The particular manner in which the radial stiffness profile of laminate 150 (and, more generally, the backing spring in which laminate 150 is included) is varied, as taken about the inner circumference of laminate 150, can be tailored to suit a particular application and will inevitably vary amongst different embodiments. In general, it is desirable to impart laminate 150 with a circumferentially-varied radial stiffness profile that is optimized to create a number of convergent wedges between the foil (as supported by the backing spring) and the outer circumference of the shaft around within the finger-foil seal is disposed during pressure loading of the seal. By creating such convergent wedge geometries, the fluid film pressure can be increased and the pressure loading capabilities of the seal can be enhanced. The radial stiffnesses of the fingers making-up each grouping 158 may specifically be chosen to create such a convergent wedge geometry radially inward of the grouping 158 (between the portion of foil contacted by the grouping the shaft) during seal pressure loading. An example of one possible manner in which the stiffness profile of finger grouping 158 (and the other fingers groupings included within laminate 150) may be varied to promote the formation of such a convergent wedge is described more fully below in conjunction with FIG. 9.

Figure 9:
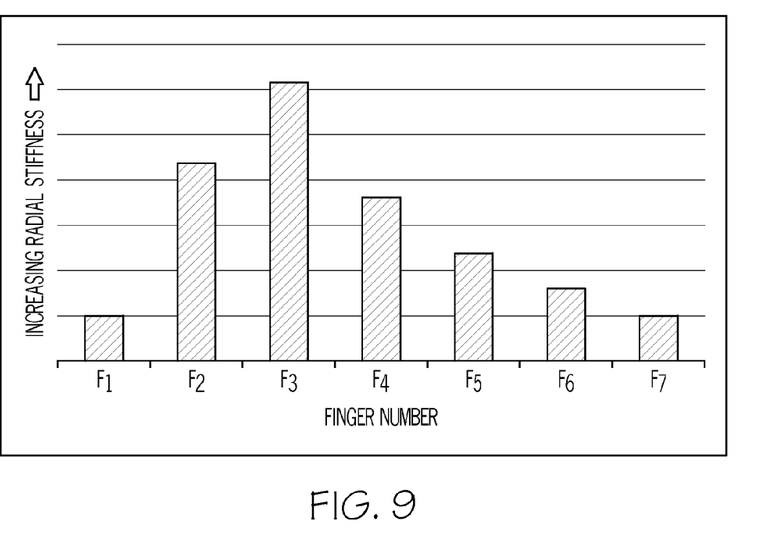
FIG. 9 is a graph illustrating one possible manner in which the respective radial stiffnesses of a sequential grouping of fingers included within laminate shown in FIG. 8 may vary in accordance with a predetermined radial stiffness profile to bring about further improvements in pressure load capacity of the finger-foil seal.

FIG. 9 illustrates one manner in which the radial stiffness profile of grouping 158 may be varied, as taken about the inner circumference of laminate 150, to promote the formation of a convergent wedge during pressuring loading of the finger-foil seal. As indicated in FIG. 9, laminate 150 may be fabricated such that the first finger ($F_1$) in grouping 158 has a predetermined minimum radial stiffness, the second finger ($F_2$) has an intermediate radial stiffness, the third finger ($F_3$) has a predetermined maximum radial stiffness. The respective stiffnesses of the latter fingers (fingers $F_4$-$F_7$ in FIGS. 8 and 9) may gradually taper-off after finger F3 until again returning to the minimum stiffness at the final finger ($F_7$). By imparting the first and last fingers ($F_1$ and $F_7$, respectively) within grouping 158 with a relatively low stiffnesses, and an intermediate finger (e.g., finger $F_3$) with a relatively high stiffness in this manner, laminate 150 may be imparted with a circumferentially-varied radial stiffness profile promoting the formation of a convergent wedge during seal pressure loading to improve the overall performance of a finger-foil seal, as previously described. Laminate 150 can thus advantageously be utilized in place of one or all of laminates 80 of backing spring 70 shown in FIGS. 2, 4, and 5 to increase the pressure load capacity of finger-foil seal 60; and in place of or all of laminates 134 of backing spring 130 shown in FIG. 6 to increase the pressure load capacity of finger-foil seal 120.

Figure 10:
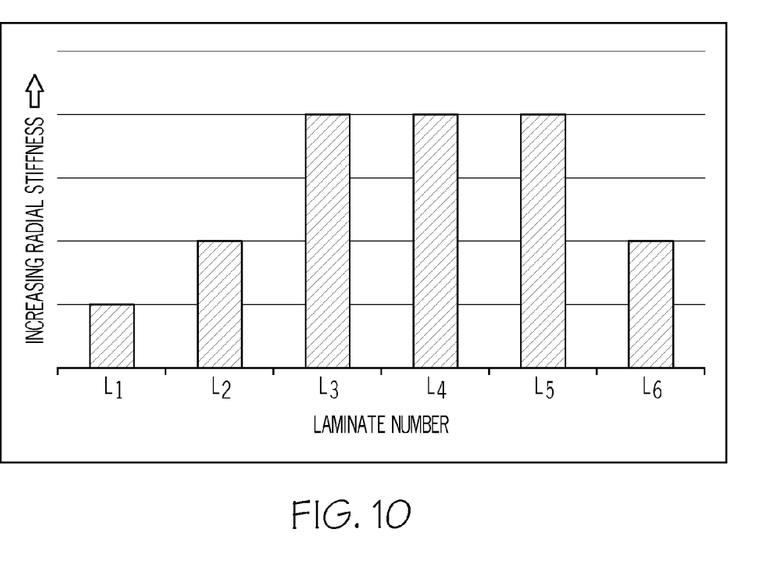
FIG. 10 is a graph illustrating one possible manner in which the radial stiffness profile of a finger seal backing spring, such as the backing spring shown in FIGS. 1-5 or the backing spring shown in FIGS. 6 and 7, may vary in an axial direction (from laminate-to-laminate) to bring about still further improvements in pressure load capacity.

The pressure load capacity of the finger-foil seal can also be increased by imparting the finger seal backing spring with a radial finger stiffness that varies in an axial direction; that is, as taken through the backing spring along a line parallel to the longitudinal axis of the finger-foil seal. In embodiments wherein the finger seal backing spring is produced from a number of stacked laminates, this can be achieved by varying the stiffness of the axially-aligned or overlapping fingers contained within different laminates. As was the case previously, the stiffness of the backing spring is preferably optimized to create a convergent wedge geometry to maximize the fluid film pressure occurring during seal operation. FIG. 10 is a graph of radial stiffness (vertical axis) versus laminate number (horizontal axis) illustrating a predetermined stiffness profile of an exemplary backing spring, such as finger seal backing spring 130 shown in FIG. 6. In this example, the backing spring includes six laminates numbered as "$L_1$" (the first or furthest upstream laminate adjacent the high pressure side of backing spring 130) to "$L_6$" (the sixth or further downstream laminate adjacent the low pressure side of spring 130). As graphically indicated in FIG. 10, the radial stiffness of backing spring 130 may gradually increase in a stepwise manner when moving axially through spring 130 in a downstream direction; e.g., the first laminate ($L_1$) may have a predetermined minimum radial finger stiffness, the second laminate ($L_2$) may have an intermediate radial finger stiffness, and the third and fourth laminates ($L_3$ and $L_4$, respectively) may each have substantially equivalent predetermined maximum radial finger stiffnesses. Conversely, after reaching the laminate or laminates imparted with the maximum radial finger stiffness, the radial stiffness of spring 130 may gradually decrease in a stepwise manner; e.g., the fifth laminate ($L_5$) may have a predetermined intermediate radial finger stiffness, and the sixth and final laminate ($L_6$) may have a predetermined minimum finger stiffness, which may be substantially equivalent to the stiffness of the first laminate ($L_1$). It has been found that such an axially-varied radial stiffness profile allows a favorable increase in fluid film pressure to improve the overall pressure load capacity of the finger-foil seal.

Referring briefly once again to FIG. 6, laminates 134 may have different thicknesses to impart backing spring 130 with a desired axially-varied radial stiffness profile, such as the axially-varied radial stiffness profile shown in FIG. 10. For example, as indicated in FIG. 6, the outermost laminates 134(*a*) and 134(*f*) (corresponding to laminates "$L_1$" and "$L_6$" in FIG. 10, respectively) may have minimum thicknesses and, therefore, minimum predetermined stiffnesses, as described above; the innermost or middle laminates 134(*c*) and 134(*d*) (corresponding to laminates "$L_3$" and "$L_4$" in FIG. 10, respectively) may have maximum thicknesses and maximum predetermined stiffnesses; and intervening laminates 134(*b*) and 134(*e*) (corresponding to laminates "$L_2$" and "$L_5$" in FIG. 10, respectively) have intermediate thicknesses and moderate stiffnesses. Additionally or alternatively, the finger stiffness can be varied axially when moving from laminate to laminate by varying the finger length, finger width, and/or the material from which the different laminates are produced. It should also be noted the stiffness of a finger seal backing spring may also vary axially in embodiments wherein the backing spring is produced from a number of laminates, which each have circumferentially-varied stiffnesses (e.g., laminate 150 shown in FIG. 8) and which are angularly staggered or clocked from laminate to laminate to deter leakage across the backing spring, as previously described.

There has thus been provided embodiments of a finger-foil seal having improved pressure load capacities. In the above-described exemplary embodiments, the finger-foil seal includes an improved foil retention structure, which maintains the aerodynamic foil in a desired position or range of positions, while minimizing the transmission of bending forces to the foil. Embodiments of the finger-foil seal have also been described including a finger seal backing spring having a stiffnesses that varies circumferentially and/or in an axial direction (e.g., from laminate to laminate when the backing spring comprises a multi-laminate stack) to bring about still further enhancements in the sealing capacity of the finger foil seal. While described above primarily in the context of a gas turbine engine, embodiments of the lift-off finger seal can be utilized within other turbomachines and rotating machines generally wherein it is desired to form an annular seal around a rotating shaft to minimize leakage from a high pressure zone or cavity to a low pressure zone or cavity. Such other rotating machines include, but are not limited to, air cycle machines, turbocompressors, turbogenerators, turboalternators, motor-driven compressors, and shaft driven compressors. Furthermore, while described above in the context of multiple exemplary embodiments, it will be appreciated that the features of the different embodiments described above can be combined to yield still further embodiments of the finger-foil seal (e.g., backing spring 70 of finger-foil seal 60 shown in FIGS. 2-5 can include one or more laminates having a circumferentially-varied stiffness, as discussed above in conjunction with FIG. 8; and/or backing spring 70 may be produced to have an axially varied stiffness, as discussed above in conjunction with FIG. 9); consequently, such embodiments are not mutually exclusive in the context of the present disclosure.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as setforth in the appended claims.

What is claimed is:

1. A finger-foil seal, comprising:
   an aerodynamic foil having a generally annular body through which a first opening is formed;
   a finger seal retention structure disposed around the aerodynamic foil;
   a finger seal backing spring coupled to the finger seal retention structure and extending radially inward therefrom to contact an outer circumferential surface of the aerodynamic foil; and
   a first anti-rotation pin extending radially from the finger seal retention structure and into the first opening in the aerodynamic foil to inhibit rotation of the aerodynamic foil during operation of the finger-foil seal.

2. The finger-foil seal of claim 1 wherein the aerodynamic foil comprises a plurality of circumferentially-spaced openings formed through the generally annular body and including the first opening, and wherein the finger-foil seal further comprises a plurality of anti-rotation pins in which the first anti-rotation pin is included, the plurality of anti-rotation pins extending radially from the finger seal retention structure and into the plurality of circumferentially-spaced openings to inhibit rotation of the aerodynamic foil during operation of the finger-foil seal.

3. The finger-foil seal of claim 1 wherein an annular clearance is provided between the finger seal retention structure and the aerodynamic foil when the aerodynamic foil is in a non-expanded state, and wherein the first anti-rotation pin extends through the annular clearance and into the first opening.

4. The finger-foil seal of claim 1 wherein the finger seal retention structure comprises:
 a low pressure cover plate positioned over a first face of the finger seal backing spring; and
 a high pressure cover plate positioned over a second, opposing face of the finger seal backing spring.

5. The finger-foil seal of claim 4 wherein the anti-rotation pin is affixed to and extends radially inward from the low pressure cover plate, and wherein the low pressure cover plate further comprises an inner circumferential shoulder abutting an end of the aerodynamic foil to prevent axial dislodgement of the aerodynamic foil during operation of the finger-foil seal.

6. The finger-foil seal of claim 4 wherein the first anti-rotation pin is affixed to and extends radially inward from the high pressure cover plate.

7. The finger-foil seal of claim 6 wherein the first anti-rotation pin retains the aerodynamic foil in an axial direction to prevent axial dislodgement of the aerodynamic foil during operation of the finger-foil seal.

8. The finger-foil seal of claim 1 wherein the finger seal backing spring includes a first laminate, the first laminate comprising:
 an outer circumferential flange portion fixedly coupled to the finger seal retention structure; and
 a plurality of radially-resilient fingers extending radially inward from the outer circumferential flange portion to contact the aerodynamic foil.

9. The finger-foil seal of claim 8 wherein the finger seal backing spring further comprises:
 a second laminate disposed adjacent the first laminate and having a thickness greater than the first laminate; and
 a third laminate disposed between the first and second laminates having a thickness less than the second laminate.

10. The finger-foil seal of claim 1 wherein the radial stiffness of the plurality of radially-resilient fingers varies in a predetermined manner, as taken about the inner circumference of the finger seal backing spring.

11. The finger-foil seal of claim 10 wherein the plurality of radially-resilient fingers are divided into a plurality of finger groupings, each grouping comprising:
 a first finger having a first predetermined radial stiffness; and
 a second finger downstream of the first finger and having a second predetermined radial stiffness greater than the first predetermined radial stiffness.

12. The finger-foil seal of claim 11 wherein each of the plurality of finger groupings further comprises a third finger downstream of the second finger and having a third predetermined radial stiffness less than the second predetermined radial stiffness.

13. The finger-foil seal of claim 11 wherein the first finger has a length greater than the second finger.

14. The finger-foil seal of claim 1 wherein the finger seal backing spring comprises a plurality of laminates, and wherein the radial stiffness of the finger seal backing spring varies in a predetermined manner when moving axially through the finger seal backing spring from laminate to laminate.

15. The finger-foil seal of claim 14 wherein the finger-foil seal has a high pressure side and a low pressure side, and wherein the plurality of laminates comprise:
 a first laminate disposed adjacent the high pressure side of the finger-foil seal;
 a second laminate disposed adjacent the low pressure side of the finger-foil seal; and
 a third laminate disposed between the first and second laminates, the third laminate having a predetermined maximum radial stiffness greater than the radial stiffness of the first laminate and greater than the stiffness of the second laminate.

16. A finger-foil seal, comprising:
 an aerodynamic foil having a generally annular body through which a first opening is formed;
 a finger seal retention structure disposed around the aerodynamic foil; and
 a finger seal backing spring coupled to the finger seal retention structure and extending radially inward therefrom to contact an outer circumference of the aerodynamic foil, the finger seal backing spring comprising at least one laminate having a predetermined radial stiffness profile that varies as taken around the inner circumference of the at least one laminate;
 wherein the at least one laminate comprises a plurality of radially-resilient fingers contacting the aerodynamic foil, wherein the plurality of radially-resilient fingers is divided into multiple finger groupings, each finger grouping increasing in radial finger stiffness and then decreasing in radial finger stiffness when moving from finger to finger in a first direction around the inner circumference of the at least one laminate.

17. The finger-foil seal of claim 16 wherein the at least one laminate comprises:
 an outer circumferential flange portion fixedly coupled to the finger seal retention structure; and
 a plurality of slits formed in the at least one laminate and at least partially defining the plurality of radially-resilient fingers, the plurality of slits encroaching into the outer circumferential flange portion to varying extents to impart the plurality of radially-resilient fingers with different lengths and disparate radial stiffnesses.

18. A finger-foil seal, comprising:
 an aerodynamic foil having a generally annular body through which a first opening is formed;
 a finger seal retention structure disposed around the aerodynamic foil; and
 a finger seal backing spring coupled to the finger seal retention structure and extending radially inward therefrom to contact an outer circumference of the aerodynamic foil, the finger seal backing spring comprising a plurality of laminates and having a predetermined radial stiffness profile that varies as taken axially through the finger seal backing spring from laminate to laminate;
 wherein the plurality of laminates includes at least one intermediate laminate, wherein the finger seal backing spring increases in radial stiffness when moving axially through the finger seal backing spring in a downstream direction until reaching the at least one intermediate laminate, and wherein the finger seal backing spring decreases in radial stiffness when moving axially through the finger seal backing spring in the downstream direction after reaching the at least one intermediate laminate.

19. The finger-foil seal of claim 18 wherein the plurality of laminates further comprises first and second laminates each having a thickness, wherein the at least one intermediate laminate is positioned between the first and second laminates, and wherein the at least one intermediate laminate has a thickness greater than the respective thicknesses of the first and second laminates as taken axially through the finger seal backing spring.

20. A gas turbine engine, comprising:
  an engine housing containing a high pressure zone and a low pressure zone during operation of the gas turbine engine;
  a shaft rotatably mounted in the engine housing and extending from the low pressure zone to the high pressure zone; and
  a finger-foil seal, comprising:
    an aerodynamic foil disposed around the shaft and having a generally annular body through which a first opening is formed;
    a finger seal retention structure disposed around the aerodynamic foil;
    a finger seal backing spring coupled to the finger seal retention structure and extending radially inward therefrom to contact an outer circumference of the aerodynamic foil; and
    a first anti-rotation pin extending radially from the finger seal retention structure and into the first opening formed in the aerodynamic foil to inhibit rotation of the aerodynamic foil during operation of the finger-foil seal.

* * * * *